US010509634B2

(12) United States Patent
Abadi et al.

(10) Patent No.: US 10,509,634 B2
(45) Date of Patent: Dec. 17, 2019

(54) DATA FLOW ANALYSIS FOR DYNAMIC APPLICATION, SKIPPING VIEWS

(71) Applicant: International Business Machines Corporation, Armonk, NY (US)

(72) Inventors: Aharon Abadi, Petach Tikva (IL); Idan Ben-Harrush, Givat Elah (IL); Shmuel Kallner, Tal Menashe (IL); Oleg Sternberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/084,509

(22) Filed: Mar. 30, 2016

(65) Prior Publication Data

US 2017/0286104 A1 Oct. 5, 2017

(51) Int. Cl.
*G06F 8/41* (2018.01)

(52) U.S. Cl.
CPC .................... *G06F 8/433* (2013.01)

(58) Field of Classification Search
USPC ................................................ 717/155, 156
See application file for complete search history.

(56) References Cited

U.S. PATENT DOCUMENTS

| | | | |
|---|---|---|---|
| 5,689,711 A * | 11/1997 | Bardasz | G06F 8/34 345/420 |
| 8,286,149 B2 | 10/2012 | Dor et al. | |
| 8,799,884 B2 | 8/2014 | Dreyer et al. | |
| 8,856,726 B2 | 10/2014 | Conrad et al. | |
| 2003/0160825 A1* | 8/2003 | Weber | G06F 3/0486 715/769 |

(Continued)

OTHER PUBLICATIONS

Jakob Pogulis., "Generation of dynamic control-dependence graphs for binary programs", Department of Computer and Information Science, Database and information techniques. Linköping University, The Institute of Technology. 2014 (English), Can be found at: http://www.diva-portal.org/smash/record.jsf?pid=diva2%3A743717&dswid=-605.

(Continued)

*Primary Examiner* — Bing Zhao
*Assistant Examiner* — Hui-Wen Lin
(74) *Attorney, Agent, or Firm* — Roy S. Melzer

(57) ABSTRACT

According to some embodiments of the present invention there is provided a method for identifying control dependencies between a source code and selected paths though the source code comprising: receiving an source code having a plurality of application functionalities, calculating a control graph dataset mapping a plurality of code segments of the source code into a plurality of source code execution paths, defining at least one control dependency from at least one source code execution path to the source code, receiving a subgroup defining a plurality of selected application functionalities from the plurality of application functionalities, identifying at least one of the plurality of source code execution paths that covers suitable code segments of the plurality of code segments which are required for performing application functionalities from the subset, and identifying at least one control dependency to eliminate within the one identified source code execution path.

16 Claims, 10 Drawing Sheets

(56) References Cited

U.S. PATENT DOCUMENTS

| | | | |
|---|---|---|---|
| 2005/0108696 A1* | 5/2005 | Dai | G06F 8/456 |
| | | | 717/151 |
| 2005/0131927 A1* | 6/2005 | Fildebrandt | G06F 8/34 |
| 2007/0089075 A1* | 4/2007 | Ward | G06F 17/504 |
| | | | 716/106 |
| 2012/0324454 A1* | 12/2012 | Gounares | G06F 9/44521 |
| | | | 718/100 |
| 2014/0109106 A1 | 4/2014 | Fanning et al. | |
| 2014/0331117 A1 | 11/2014 | Liu et al. | |
| 2015/0378871 A1* | 12/2015 | Asthana | G06F 8/443 |
| | | | 717/122 |

OTHER PUBLICATIONS

Deoxys., "Dynamically build a Build Dependency Graph", Can be found at: http://www.codeproject.com/Articles/699338/Dynamically-build-a-Build-Dependency-Graph, Dec. 19, 2013.

* cited by examiner

DATA FLOW ANALYSIS FOR DYNAMIC APPLICATION, SKIPPING VIEWS

BACKGROUND

The present invention, in some embodiments thereof, relates to a method to generate a source code that is a subset of an original source code and, more specifically, but not exclusively, to identifying dependencies between paths in a source code by applying control and data dependency methodologies.

There is great demand for applications that change their behavior based on information received from users or other runtime inputs. It is sometimes desirable to achieve changes in application behavior by choosing a subset of the application functionality, and excluding the rest of the application. For example, in order to simplify a user interface it is sometimes desirable to provide a subset of all functionality implemented in a program. Mobile applications in particular may offer multiple options that may be hidden from the user to simplify the user interface.

When attempting to reduce a software program by skipping undesired functionality, a number of technical challenges are encountered. The reduced program may include data that depends on excluded code for definition. Reducing the program in this case would result in unpredictable program behavior due to the broken data dependency.

Another problem is managing control flow. If the program receives input from a user during run time, and the user input determines the control flow of the program, it is difficult to accurately and consistently predict run time control flow. In addition, changes in control flow may change or add data dependencies.

While there exist automatic tools that track data and control dependencies, these tools target code that has a single point of entry and exit. The existing tools are not effective with programs where control flow is dynamically determined at run time. Currently analysis of control flow and data dependencies for programs with dynamic run time control flow are performed manually without the aid of software engineering methodology or automated tools.

SUMMARY

According to an aspect of some embodiments of the present invention there is provided a method for identifying control dependencies between a source code and selected paths though the source code comprising: receiving a source code of an application having a plurality of application functionalities, calculating a control graph dataset mapping a plurality of code segments of the source code into a plurality of source code execution paths, and defining at least one control dependency from at least one the source code execution path to the source code, receiving a subgroup defining a plurality of selected application functionalities from the plurality of application functionalities to be implemented in a software source code, identifying at least one of the plurality of source code execution paths, the at least one source code execution path covers suitable code segments of the plurality of code segments which are required for performing application functionalities from the subset, and identifying at least one the control dependency to be eliminated within the at least one identified source code execution path.

Optionally, defining the at least one control dependency comprises generating a finite state machine from the source code, and identifying at least one node of the finite state machine that both dominates another node, and has at least one successor node that does not dominate the other node.

Optionally, the at least one node that dominates another node may be identified from the finite state machine according to the Langauer-Tarjen algorithm, the Cooper-Harvey-Kennedy algorithm, or any other algorithm adapted to identifying dominator nodes in a finite state machine.

Optionally, removing at least one the identified control dependency.

Optionally, generating at least one application source code comprising one the at least one source code execution path wherein the at least one identified control dependency has been removed.

Optionally, the source code when executed is a mobile application and at least one of the control dependencies is dependent on a user input to at least one of a plurality of user interface screens presented on a display of a mobile device that runs the mobile applications.

According to an aspect of some embodiments of the present invention there is provided a method for identifying data dependencies between a source code and selected paths though the source code comprising: receiving a source code of an application having a plurality of application functionalities, calculating a data dependency graph dataset mapping a plurality of code segments of the source code into a plurality of source code execution paths and identifying at least one data element dependency within the source code application path data element on at least one data element from the source code, receiving a subgroup defining a plurality of selected application functionalities from the plurality of application functionalities to be implemented in a software source code, identifying at least one of the plurality of source code execution paths, the at least one source code execution path covers suitable code segments of the plurality of code segments which are required for performing application functionalities from the subset, and identifying at least one the identified data element dependency to be eliminated for at least one the identified source code execution path.

Optionally, removing at least one the identified data element dependency from the at least one source code execution path.

Optionally, removing the data dependency comprises replacing a variable data element with a set value.

Optionally, removing the data element comprises deleting a function call wherein user input updates data elements.

Optionally, removing the data dependency comprises calls to functions that return a calculated value, the function calls replaced with calls to a new function that returns a set value.

Optionally, a revised source code is generated from the at least one source code execution path and wherein the at least one identified data dependency has been removed.

Optionally, wherein the data dependency graph dataset is calculated based on data elements modified by user input during runtime.

Optionally, wherein the data dependency graph dataset is calculated based on dependencies between inputs and outputs of the source code execution path.

Optionally, wherein the data dependency graph dataset is calculated based on dependencies of data elements referenced within the source code execution path on data elements external to the source code execution path.

Optionally, wherein the source code when executed is a mobile application and at least one of the data dependencies is dependent on a user input to at least one of a plurality of user interface screens presented on a display of a mobile device that runs the mobile applications.

According to an aspect of some embodiments of the present invention there is provided a method and system for identifying data dependencies between a source code and selected paths though the source code comprising: an interface for communicating with a user, one or more non-transitory computer-readable storage mediums, code instructions stored on at least one of the one or more storage mediums, one or more processors coupled to the interface and the program store for executing the code instructions, the code instructions comprising: code instructions for receiving input from the user, code instructions for receiving a source code comprising a plurality of application functionality, the source code is received according to a user input via the interface, code instructions for calculating at least one graph dataset mapping a plurality of code segments of the source code into a plurality of source code execution paths and identifying control and data dependencies of the source code execution path to the source code, code instructions for identifying at least one of the plurality of source code execution paths, the at least one source code execution path covers suitable code segments of the plurality of code segments which are required for performing application functionalities from the subset, and code instructions for identifying at least one the identified dependency to be eliminated for at least one the identified source code execution path.

Optionally, code instructions for receiving a file comprising a text list of the application functionality and automatically selecting the identified source code execution path according to the list, the list is received according to a user input received via the interface.

Optionally, the interface comprising a graphic user interface (GUI) allowing the user to input the source code by manually inputting a file name and a directory path and/or to the list of sensitive data, and/or to drag and drop a file containing the source code and/or a file containing the list of sensitive data into the GUI.

Optionally, code instructions for editing the identified execution path source code via the interface by the user.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
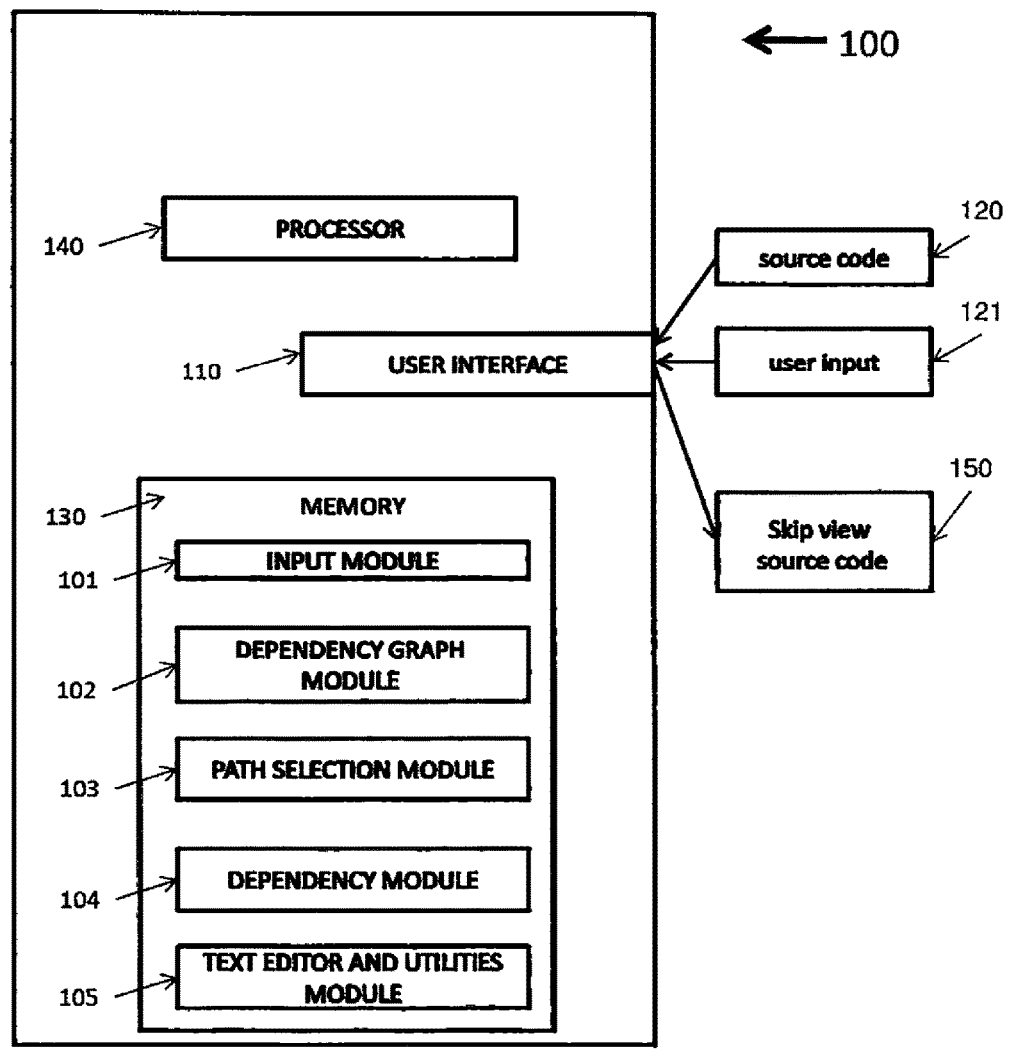
FIG. 1 is a schematic illustration of an exemplary system for identifying data and control dependencies between a source code and an execution path built according an analysis of functionality of the source code, according to some embodiments of the present invention.

The present invention, in some embodiments thereof, relates to a method to generate a source code that is a subset of an original source code and, more specifically, but not exclusively, to identifying dependencies between paths in a source code by applying control and data dependency methodologies.

When attempting to separate a subset of functionalities from other functionalities of an application, the dependencies that exist between the subset of the application and the other control and/or data functions of the application may cause the program subset to fail to execute, or to execute with undefined outcome. While solutions exist for source codes with single entry/exit points, and/or for run time control flow that is deterministic, the present invention, in some embodiments thereof, applies also to source codes with multiple exit points and source codes accepting user inputs in runtime.

The present invention, in some embodiments thereof, comprises a method to separate an execution path from a source code, while identifying code and control dependencies. An execution path refers to a series of source code statements, instructions and/or function calls that are executed and/or evaluated by a processor in the same order as they appear in the series. The execution path may be chosen because it implements a desired subgroup of the functionality of the application source code.

The dependencies between the execution path and the application source code are identified using software engineering methodologies. Control dependencies are identified by generating a control dependency graph for the application source code. Data dependencies are identified by generating a data dependency graph identifying dependencies from the execution path to the application source code.

Once the dependencies have been identified, optionally software engineering methodologies are employed to remove the dependencies. When removing the dependencies is not practical, the execution path may be expanded to include the dependencies. A source code that has dependencies eliminated is referred to herein as a skip view source code, since it is a path that skips views, or states, that contain control or data dependencies.

Optionally, the resulting skip view source code may then be an independent source code that may be executed without communicating with the application source code. The present invention, in some embodiments thereof, is a method for receiving a source code, for example an installation utility for a mobile application with multiple user interface screens, and generating one or more skip view source codes that skips sections of the user interface without causing the source code to malfunction. The new source code may provide a user with a simplified and less time consuming interface. In addition, the time and resources required to develop source codes with a subset of functionality from a single original source code is significantly reduced.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, a schematic illustration of an exemplary system 100 for identifying dependencies between a source code and an execution path within the source code, according to some embodiments of the present invention.

System 100 comprises a user interface (UI) 110 for receiving and sending files and data to and from a user, for example a source code and a list of desired functionality. Optionally, the UI may be a Graphical User Interface (GUI) or a different human-machine interfaces, for example a text interface and/or audio interface. The GUI may present one or more users a visual interface displayed on a screen coupled with input devices, for example a keyboard, touch screen, and/or a pointing device.

UI 110 receives a source code 120 and/or user text input 121 from a user, from a networked location, and/or from a location within memory 130. Optionally, the source code may be cut and pasted into the UI, and/or a file name and file location of the source code may be provided to the UI by the user.

Memory 130 stores code instructions, source code 120, and/or user input 121. The code instructions are executed on processor 140. The code instructions stored in memory 330 are functionalities divided into modules, wherein a module refers to a set of program instructions and related data structures that implement a set of functionalities and are stored in a non-transitory medium to be executed by processor.

Input module 101 is adapted to receive a source code from a location in memory 130, from a networked server, and/or from a file provided by a user via UI 110.

Dependency graph module 102 is adapted to calculate source code execution paths through the source code, and to calculate a graph dataset mapping control and data dependencies of the source code, according to the method described below.

Path selection module 103 is adapted to receive via the UI a subgroup of functionalities that are desired to be enabled within the source code, and select one or more source code execution path that fulfills all or most of the desired functionality, according to the method described below. A selected source code execution path is referred to herein as a selected path.

Dependency module 104 is adapted to identify control and data dependencies of the selected path that may be eliminated, according to the method described below.

Text editor module 105 is adapted to accept user input to manually edit text and/or a selected path. Optionally, the identified dependencies may be eliminated from the selected path, creating a skip view source code. As seen in 150, optionally the skip view source code is provided by the UI to a user.

Figure 2A:
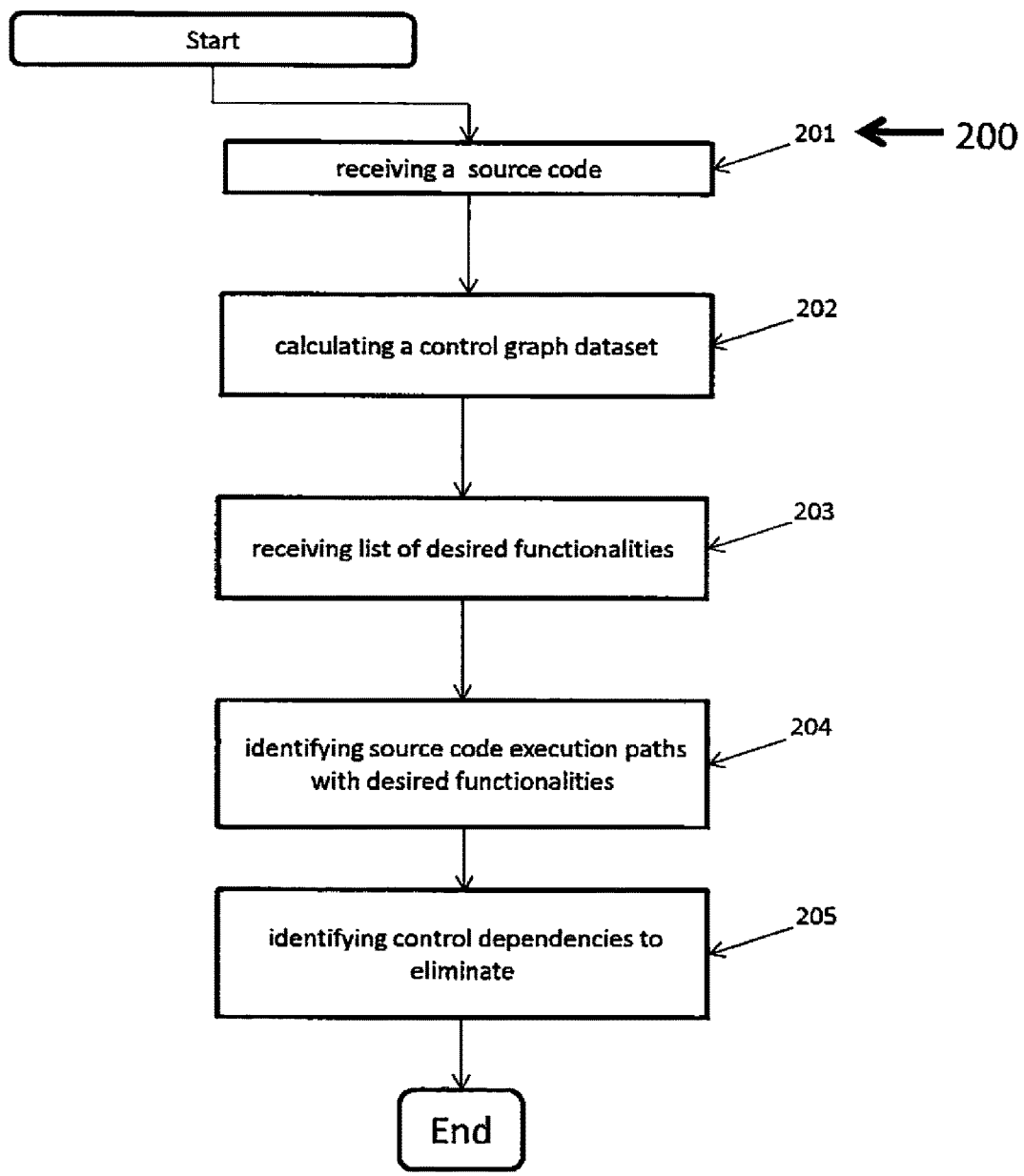
FIG. 2A is a flowchart of an exemplary process for identifying control dependencies between a source code and an execution path built according an analysis of functionality of the source code, according to some embodiments of the present invention.

Reference is now made to FIG. 2A, a flowchart of an exemplary process 200 for identifying control dependencies between a source code and an execution path built according an analysis of functionality of the source code, according to some embodiments of the present invention.

Exemplary process 200 is executed by one or more processors 140 and stored in memory 130, for example as an independent tool.

As shown in receiving source code 201, a source code is received via UI 110. The source code may be input manually and/or as a file by one or more users and/or the user may designate a location of a source code, for example an enterprise network database and/or a location in memory 130. The source code may be stored in a memory, for example stored in memory 130 by input module 101 when executing on processor 140. The source code is an application source code with one or more sets of application functionality, one starting point, one or more end points, and one or more possible execution path.

Optionally, the application has more than one exit point. Optionally, the application is a mobile application, with one or more user interface screen that accepts inputs from the use, wherein the user input causes changes to control flow and/or data dependencies within the application. Optionally, the one or more sets of functionality comprise sets of user interface screens of the mobile application.

The source code may be written in any type of programming language, including object oriented, procedural, event driven, compiled, and/or interpreted. The source code may be executed in any type of operating system including multitasking, distributed, and/or real time.

As shown in calculating control dependencies 202, a control graph dataset is calculated for the source code, for example by code instructions in code dependency graph module 102 when executed on processor 140. The control graph dataset comprises calculating at least two source code execution paths through the source code, and defining one or more control dependencies from each source code execution path to the source code.

The source code execution paths may be calculated by executing a control flow graph (CFG) on the source code, for example by CoFlo by SourceForge, Java Front End by Semantic Designs, or any other CFG generator known in the art. CFG generators are directed to a specific programming language, so the CFG is chosen according to the programming language of the source code.

As shown in calculating control dependencies 202, the control dependencies are calculated, for example by code instructions in dependency graph module 102 executed on processor 140. The control dependencies comprises for each source code execution path a list of statements, instructions, and/or function calls that may transfer control flow to a block of source code outside the corresponding source code execution path. The method of calculating the control graph dataset is described below in reference to FIG. 2B.

As shown in receiving functionalities 203, a list of desired functionalities is received, for example via UI 110 by code instructions in execution path module 103 executing on processor 140. Optionally, the list is received from a computer network server, a memory location for example memory 130, a user inputting a file location within an accessible computer file system, and/or from a user input of text. The list of desired functionalities comprises a subgroup of functionalities implemented in the source code. For example, it may be desirable to enable a subgroup of functionality within a source code. The control graph dataset depicts source code execution paths that may lead to the desired functionality, and the control flow branches within the source code execution path that may prevent control flow from reaching the desired functionality.

As shown in selecting paths 204, one or more source code execution paths are selected that implement most or all of the functionality in the list of desired functionality, for example by code instruction in execution path module 103 executing on processor 140. Optionally, the selected path is selected by user input, for example by a user entering text via UI 110. Optionally, the selected path is selected automatically, for example by code instruction in path selection module 103 that when executed on processor 140 identify key words from the list of desired functionality and match the key words with text in one or more source code execution paths.

As shown in removing control dependencies 205, one or more control dependencies are identified from the one or more selected paths in the control graph dataset. Optionally, the one or more of the control dependencies is identified automatically, for example by code instructions in dependency module 104 executed by processor 140, for example code instruction to access the control graph dataset calculated by dependency module 102 and identifying each control flow branch that exits the selected path.

Optionally, the one or more control dependencies from the one or more selected paths are selected by user input, for example user input to text editor module 106 via UI 110.

Optionally, the one or more identified control dependency is removed from the selected path. Optionally, a user may remove the identified control dependency using a text editor, an Integrated Development Environment (IDE), or any other computerized means, for example the text editor module 105 when executing on processor 140. Optionally, removing the one or more identified control dependency comprises deleting a function call, a conditional statement, a conditional block of code, and/or any other method of software engineering.

Figure 2B:
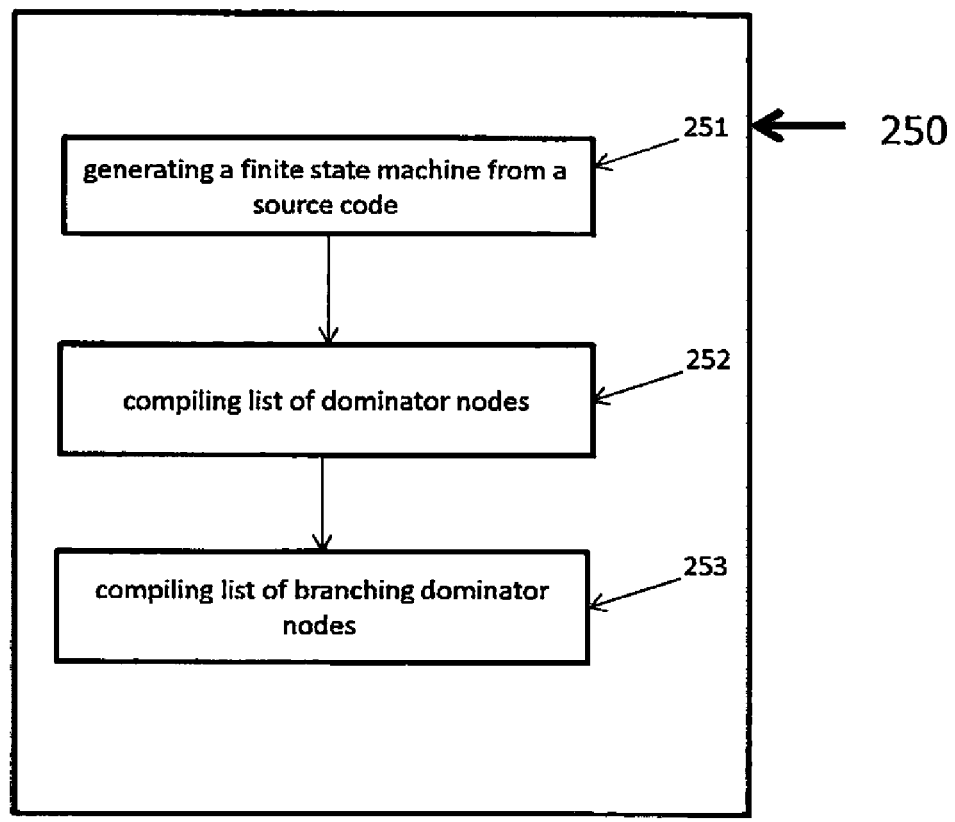
FIG. 2B is a flowchart of an exemplary process for calculating a control graph dataset for a source code, according to some embodiments of the present invention.

Reference is now made to FIG. 2B, a flowchart of an exemplary process 250 for calculating a control graph dataset defining control dependencies between a source code and an execution path built according an analysis of functionality of the source code, according to some embodiments of the present invention.

As shown in 251, a finite state machine (FSM) is calculated for the source code, for example by code instructions in dependency graph module 102 executing on processor 140. Optionally, the FSM may be calculated by any FSM generator, for example FSMGenerator by Pavel Beckerman, AutoFSM by GNU, or any other FSM generator known in the art when executed on a processor. FSM generators are directed to a specific programming language, so the FSM generator is chosen according to the programming language of the source code.

The FSM comprises states and transitions between states. A source code state is a block of source code where transfer of control flow may occur, and the control flow transfer is determined by a combination of the existing state and inputs to the source code. The combination of a given state and a specific input determines to which state the control flow is transferred. For example, in a source code application, a display screen welcoming a user is an initial state of the source code. When a user input requests a search for an item to be performed, the combination of the welcome screen initial state and the received input requesting search for an item result in the control flow transferring to a new state, namely a block of code displaying a search interface. Each source code execution path may be represented by the FSM as a series of states and transitions between states.

As shown in 252, a list of dominator nodes is compiled from the FSM, for example by code instructions in dependency graph module 102 executing on processor 140. A certain node dominates another node when every execution path to the other node must first pass through the certain node. The list of dominator nodes may be calculated from the FSM according to the Langauer-Tarjen algorithm, the Cooper-Harvey-Kennedy algorithm, or any other algorithm adapted to identifying dominator nodes in a FSM.

As shown in 253, a list of branching dominator nodes is calculated from the list of dominator nodes, for example by code instructions in dependency graph module 102 executing on processor 140. Branching dominator nodes are dominator nodes where control flow may potentially exit the source code execution path. Each branching dominator node within a source code execution path comprises a possible control dependency. A branching dominator node has at least two possible transitions of control flow. At least one transition of control flow leads to and dominates a certain node within the source code execution path. At least one transition of control flow does not dominate the certain node. Optionally, the list of branching dominator nodes may be compiled manually by a user. Optionally, the list of branching dominator nodes is compiled automatically, for example by code instructions in dependency graph module 102 and executed on processor 140 adapted to searching for branching dominator nodes.

Optionally, the source code is a mobile application, and the selected source code after removal of identified control dependencies comprises a subgroup of functionality that skips user interface screens presented to a user on a display of a mobile device that runs mobile applications.

Optionally, the selected path from which at least one data dependency has been removed is comprises an executable source code.

Figure 3A:
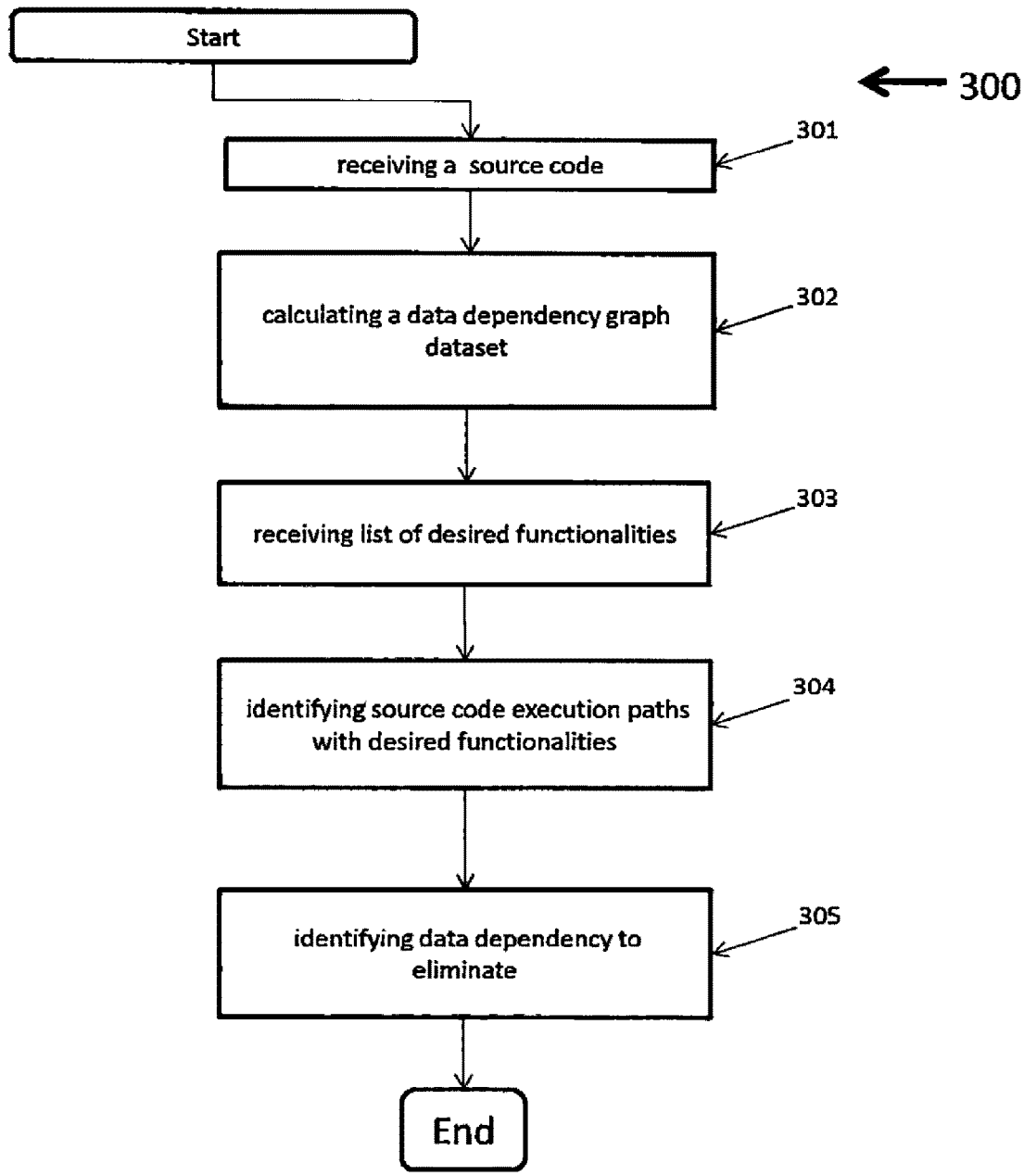
FIG. 3A is a flowchart of an exemplary process for identifying data dependencies between a source code and an execution path built according an analysis of functionality of the source code, according to some embodiments of the present invention.

Reference is now made to FIG. 3A, a flowchart of an exemplary process 300 for identifying data dependencies between a source code and an execution path built according an analysis of functionality of the source code, according to some embodiments of the present invention.

Exemplary process 300 is executed by one or more processors 140 and stored in memory 130, for example as an independent tool.

As shown in receiving source code 301, a source code is received in the same manner as described in receiving source code 201.

As shown in calculating data dependencies calculating data dependencies 302, source code execution paths are calculated in the same manner as described in calculating control dependencies 202.

As shown in calculating data dependencies 302, a data dependency graph dataset is calculated for the source code, for example by dependency graph module 102 when executed on processor 140. The data dependency graph dataset is calculated by calculating at least two source code execution paths through the source code, and defining one or more data dependencies from each source code execution path to the source code. The method of calculating the data dependency graph dataset is described below in reference to FIG. 3B.

As shown in receiving functionalities 303, a list of desired functionalities is received as described in receiving functionalities 203.

As shown in selecting paths 304 one or more source code execution paths are identified that implement most or all of the functionality in the list of desired functionality, as described in selecting paths 204. As described above, the identified source code execution paths are referred to herein as selected paths.

As shown in removing data dependencies 305, one or more data dependencies from the one or more selected paths are identified in the data dependency graph dataset. Optionally, the one or more of the data dependencies is identified automatically, for example by code instructions in dependency module 104 executed by processor 140, for example code instruction to access the control graph dataset calculated by dependency module 102 and identifying each control flow branch that exits the selected path. Optionally, the one or more data dependency is identified manually by a user, for example user input via UI 110 to text editor module 106.

Optionally, the identified data dependency is removed from the source code execution path. The dependency may be removed by a user editing the selected path. The user may edit the selected path by input via UI 110 to code instructions in text editor module executing on processor 140, by an Integrated Development Environment (IDE), or any other computerized text editing system.

Optionally, removing the data dependency comprises replacing a data element that receives a value outside the source code execution path, for example a global variable, with a data element with a set value.

Optionally, removing data element comprises deleting a function call that accepts user input that updates data elements.

Optionally, removing the data dependency comprises replacing calls to functions that return a calculated value with calls to a new function that returns a set value.

Figure 3B:
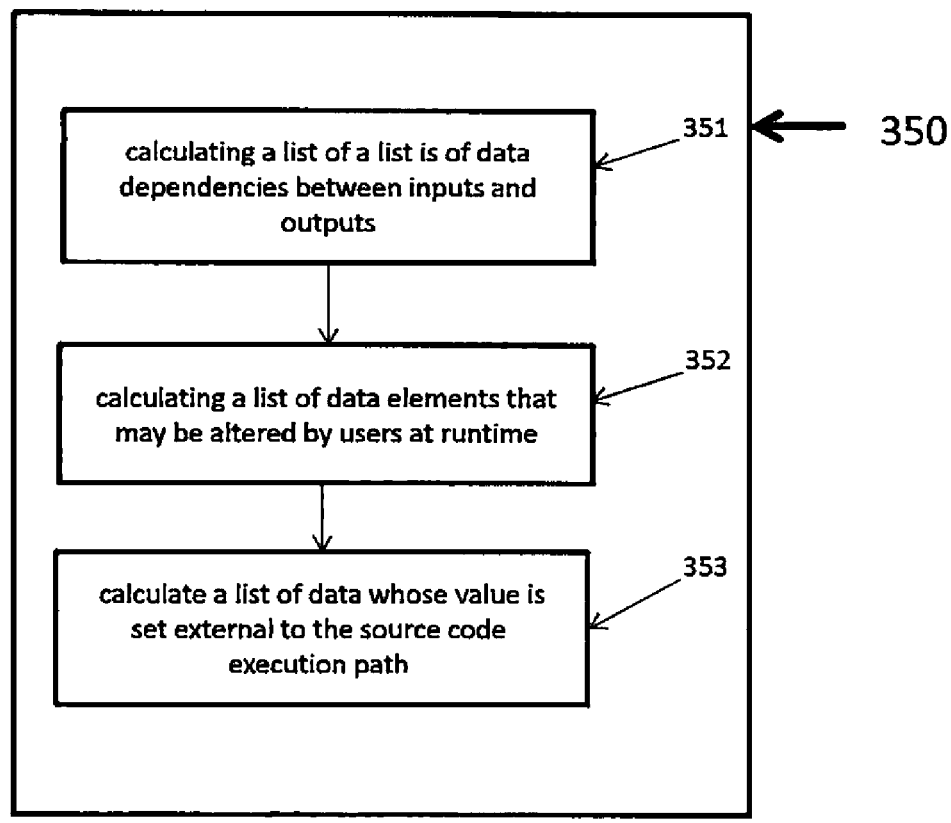
FIG. 3B is a flowchart of an exemplary process for calculating a data dependency graph dataset for a source code, according to some embodiments of the present invention.

Reference is now made to FIG. 3B, a flowchart of an exemplary process 350 for calculating a data dependency graph dataset defining data dependencies between a source code and an execution path built according an analysis of functionality of the source code, according to some embodiments of the present invention.

As shown in 351, optionally, a list of dependencies between inputs and outputs, a list of data elements that may be altered by users in runtime, and/or a list of data whose value is set external to the source code execution path.

As shown in 351, a list of input and output dependencies is calculated, for example by code instructions in dependency graph module 102 executed on processor 140. Optionally, the input and output dependencies may comprise values that are passed into the source code execution path, for example by a function, and values that are calculated based on data from outside the source code execution path, for example a global variable, or any other method of passing a value into a source code execution path. Optionally, the list of input and output dependencies may be generated by static analysis algorithms, dynamic analysis algorithms, symbolic execution algorithms, or other methods known in the art.

As shown in 352, a list of data elements that may be altered by users in runtime is calculated, for example by code instructions in dependency graph module 102 executed on processor 140. Optionally, the list of data elements that may be altered by users in runtime is calculated manually by a user examining source code. Optionally, the list of data elements that may be altered by users in runtime is calculated automatically, for example by a computer program executing on a processor that searches for names of variables that match a semantic property, for example having some form of the wore "user" in the variable name.

As shown in 353, a list of elements that have data dependencies external to the source code execution path is calculated, for example by code instructions in dependency graph module 102 executed on processor 140. A data dependency exists when a data element value is set by outside the source code execution path, for example a global variable, or any other variable whose value is set outside the source code execution path.

Optionally, the source code is a mobile application, and when at least one data dependency has been removed from a selected path, the selected path comprises a subgroup of functionality that skips user interface screens presented to a user on a display of a mobile device that runs mobile applications.

Optionally, the selected path from which at least one data dependency has been removed is comprises an executable source code.

Figure 4:
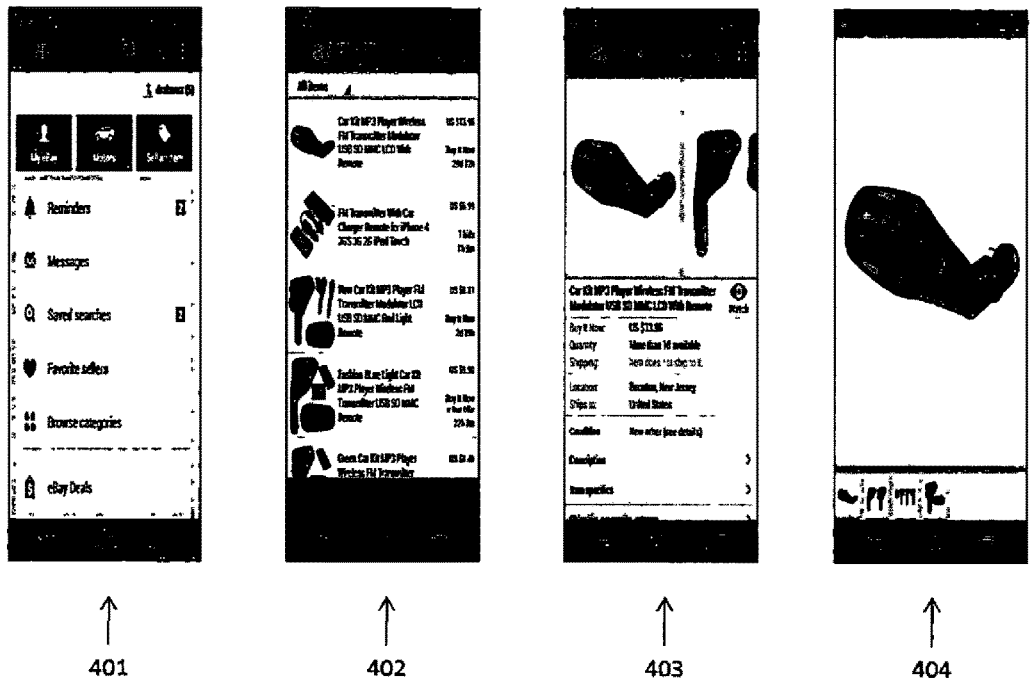
FIG. 4 is an exemplary sequence of screen displays on a computing device resulting from a user searching for a particular item, according to some embodiments of the present invention.

Some embodiments of the present invention are provided by means of examples. Reference is now made to FIG. 4, an exemplary sequence of screen displays on a computing device, according to some embodiments of the present invention. In the example displayed in FIG. 4 it is desired to identify dependencies between the source code that when executed implements the screen displays depicted in FIG. 4, and a selected path that when executed implements a subgroup of the screen displays.

As shown in search display 401, a computing device is connected, for example via the internet, to an ecommerce web site, for example www(dot)ebay(dot)com, and a user inputs via a UI in the computing device a request to search for a particular item, for example an mp3 player for an automobile. As shown in results display 402, a number of items that meet the search requirements are displayed on the UI. The user selects a specific item via the UI, and as shown in item display 403 the selected item is displayed in the UI. The user selects a picture of the item via the UI, and as shown in detail display 404 the selected picture is displayed on the UI.

In this exemplary case, it is desired to implement only screens depicted in search display 401 and detail display 404. According to some embodiments of the present invention, the dependencies are identified between the source codes the desired path comprising search display 401 and detail display 404 and the source code comprising results display 402 and item display 403, as described below.

Figure 5:
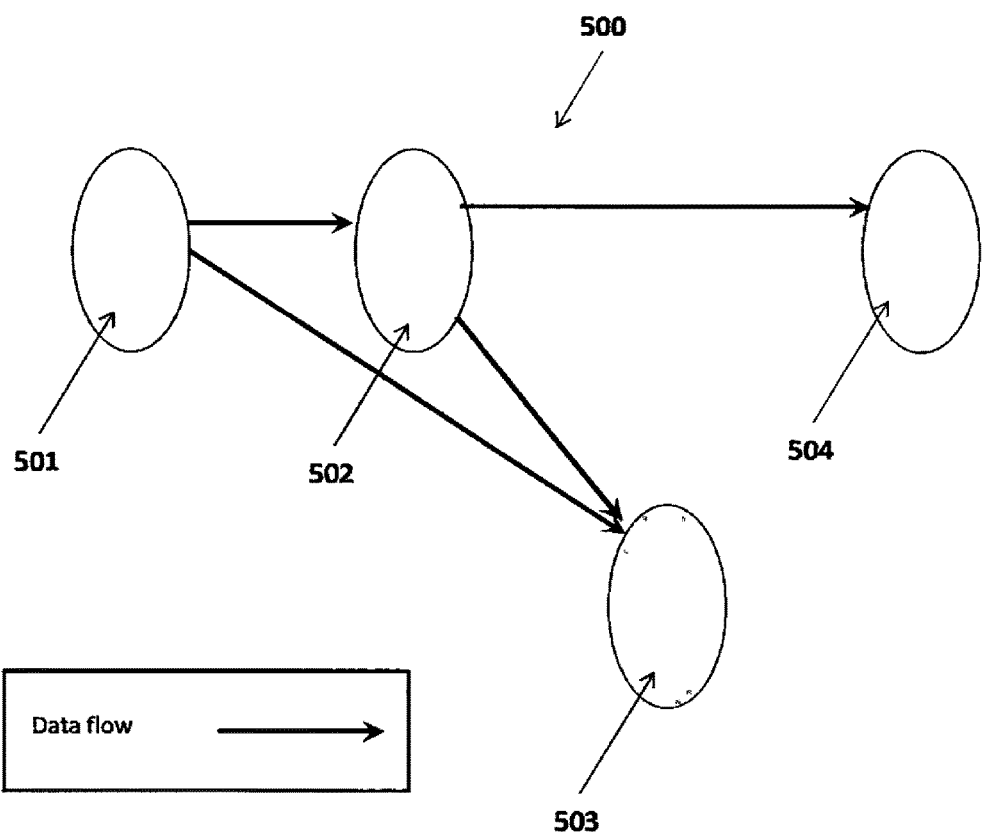
FIG. 5 is an exemplary data dependency graph for a source code implementing the display screens in FIG. 4, according to some embodiments of the current invention.

Reference is now made to FIG. 5, an exemplary data dependency graph 500 calculated from the source code that when executed implements the screen displays depicted in FIG. 4, according to some embodiments of the current invention. Data dependency graph 500 may be calculated from a data dependency graph dataset, for example by code instructions in memory 130 executing on processor 140. Search state 501 represents a source code state for a corresponding search display 401. Results state 502, item state 503, and detail state 504, represent a source code state for a corresponding screen display in results display 402, item display 403, and detail display 404. The bold solid arrows between 501, 502, 503, and 504 represent data flow.

In this exemplary case, a source code that when executed implements the screen displays in FIG. 4 is received, for example as described in receiving source code 301.

A data dependency graph dataset is calculated from the source code, as described in calculating data dependencies 302.

A list of desired functionality is received, in this exemplary case comprising search state 501 and detail state 504, for example as described in receiving functionalities 303.

The execution path comprising the desired functionality is identified, for example as described in selecting paths 304. The data dependencies calculated in calculating data dependencies 302 that can be removed are identified, for example as described in removing data dependencies 305. In this exemplary case results state 502 and item display 503 are identified as dependencies to be removed. Optionally, the reference in search state 501 to the calculation in the source code of results state 502 is replaced with a constant value. Optionally, the source code in results state 502 is included in the selected path.

Figure 6:
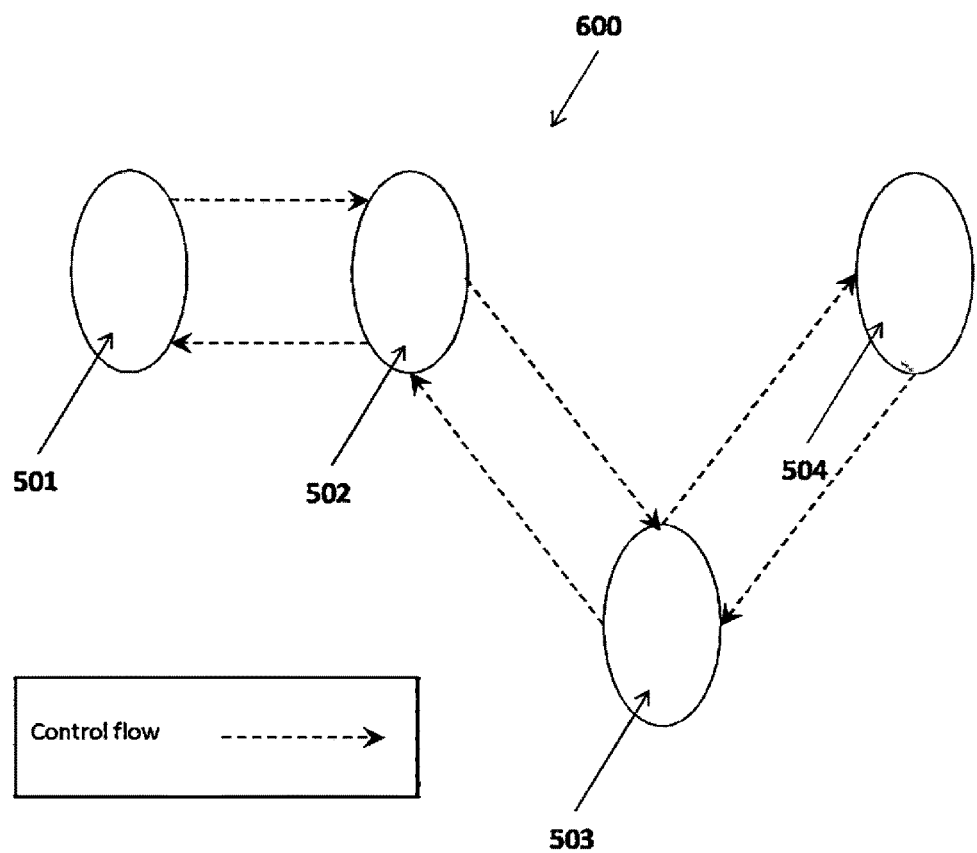
FIG. 6 is an exemplary control dependency graph for a source code implementing the display screens in FIG. 4, according to some embodiments of the current invention.

Reference also made to FIG. 6, an exemplary control dependency graph 600 calculated from the source code that when executed implements the screen displays depicted in FIG. 4, according to some embodiments of the current invention. Control dependency graph 600 may be calculated from a control graph dataset, for example by code instructions in memory 130 executing on processor 140.

In this exemplary case, a source code that when executed implements the screen displays in FIG. 4 is received, for example as described in receiving source code 201.

A control graph dataset is calculated from the source code, as described in calculating control dependencies 202.

A list of desired functionality is received, in this exemplary case comprising search state 501 and detail state 504, for example as described in receiving functionalities 203.

The execution path comprising the desired functionality is identified, for example as described in selecting paths 204. The control dependencies calculated in calculating control dependencies 202 that can be removed are identified, for example as described in removing control dependencies 205. In this exemplary case results state 502 and item display 503 are identified as control dependencies to be removed. Optionally, the control flow in the source code in results state 502 that transfers control to display state 502 is replaced with a hard coded control flow transfer to detail state 504. Optionally, the code in results state 502 is included in the selected path.

Figure 7:
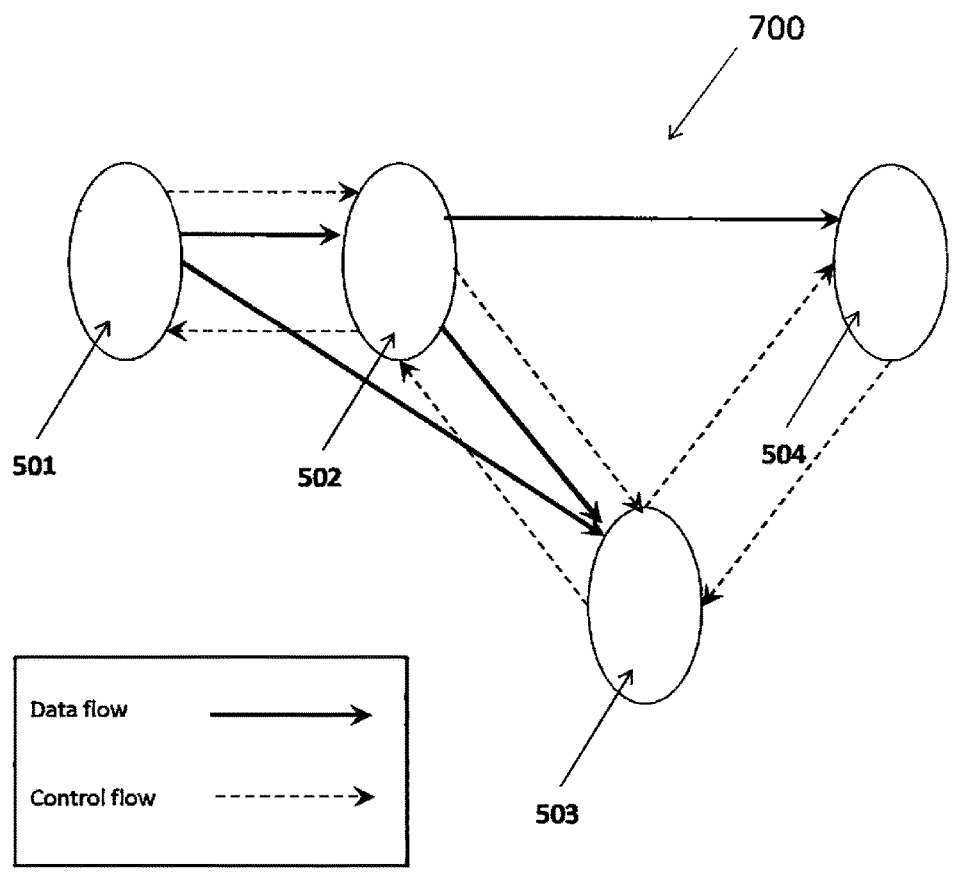
FIG. 7 is an exemplary control and data dependency graph for a source code implementing the display screens in FIG. 4, according to some embodiments of the current invention.

Reference is also made to FIG. 7, an exemplary combined data and control dependency graph 700 calculated from the source code that when executed implements the screen displays depicted in FIG. 4, according to some embodiments of the current invention. FIG. 7 shows the combined data and control dependencies that may be removed, in this exemplary case results state 502 and item state 503.

Figure 8:
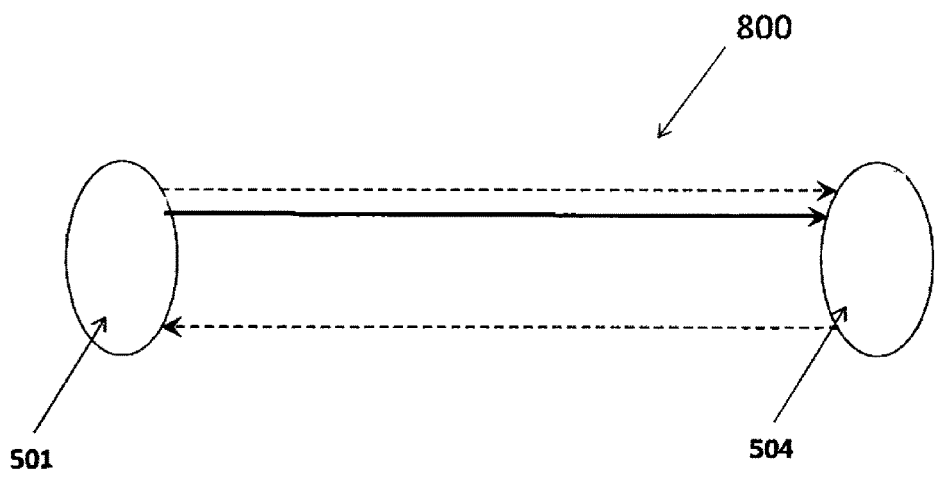
FIG. 8 is the exemplary combined data and control dependency graph in FIG. 5 after control and data dependencies have been removed, according to some embodiments of the current invention.
Figure 8:
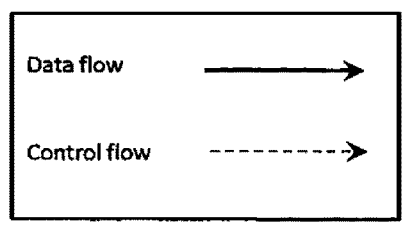

Reference is also made to FIG. 8, an exemplary combined data and control dependency graph 700 calculated from the source code that when executed implements the screen displays depicted in FIG. 4 after control and data dependencies have been removed, according to some embodiments of the current invention. Optionally, the control and data dependencies in results state 502 and item state 503 have been replaced with set values, resulting in a source code that may be compiled and executed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant software engineering methodologies will be developed and the scope of the terms data dependency graph and control dependency graph is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for improving a performance of user interface of an application through a controlled removal of functionalities from source code of said application by identifying control dependencies between the source code and selected paths through said source code comprising:

receiving a source code of an application, wherein when said source code is executed, said application implements a plurality of application functionalities;

calculating a control graph dataset mapping a plurality of code segments of said source code into a plurality of source code execution paths, and defining a plurality of control dependencies from at least one of said plurality of source code execution paths to said source code;

receiving a list of a subgroup of said plurality of application functionalities desired to be enabled in at least one new application source code, said subgroup is a reduced set of said plurality of application functionalities;

for each application functionality of said subgroup of said plurality of application functionalities, identifying, in said plurality of source code execution paths, at least one source code execution path which covers suitable code segments of said plurality of code segments required for performing respective said each application functionality;

identifying at least one of said plurality of control dependencies required to be eliminated within said at least one identified source code execution path;

generating said at least one new application source code comprising said subset of said plurality of code segments and implementing said reduced set of application functionalities, wherein said identified at least one of said control dependencies is eliminated in said at least one new application source code, wherein said at least one new application source code, not implementing application functionalities not included in said reduced set, when executed, causes said user interface of said application to be simplified and accelerated than when said source code of said application is executed;

wherein defining said plurality of control dependencies comprises generating a finite state machine from said source code, and identifying at least one node of said finite state machine which dominates another node, and which has at least one successor node that does not dominate said another node; and wherein in said generated at least one new application source code, said at least one of said identified control dependencies has been removed or replace with a control dependency corresponding to at least one of the execution path identified.

2. The method of claim 1, wherein said at least one node that dominates another node may be identified from said finite state machine according to the Langauer-Tarjen algorithm, the Cooper-Harvey-Kennedy algorithm, or any other algorithm adapted to identifying dominator nodes in a finite state machine.

3. The method of claim 1, further comprising removing at least one of said identified control dependencies.

4. The method of claim 1, wherein said source code when executed is a mobile application and at least one of said plurality of control dependencies is dependent on a user input to at least one of a plurality of user interface screens presented on a display of a mobile device that runs said mobile applications.

5. A method for improving a performance of user interface of an application through a controlled removal of functionalities from source code of said application by identifying data dependencies between the source code and selected paths through said source code comprising:
- receiving a source code of an application, wherein when said source code is executed, said application implements a plurality of application functionalities;
- calculating a data dependency graph dataset mapping a plurality of code segments of said source code into a plurality of source code execution paths and identifying a plurality of data element dependencies from at least one of said plurality of source code execution paths to at least one data element from said source code;
- receiving a list of a subgroup of said plurality of application functionalities desired to be enabled in at least one revised source code, said subgroup is a reduced set of said plurality of application functionalities;
- for each application functionality of said subgroup of said plurality of application functionalities, identifying, in said plurality of source code execution paths, at least one source code execution path which covers suitable code segments of said plurality of code segments required for performing respective said each application functionality;
- identifying at least one of said plurality of data element dependencies required to be eliminated within said at least one identified source code execution path; and
- generating said at least one revised source code, wherein said identified at least one data element dependency is eliminated in said at least one new application source code, wherein said at least one new application source code, not implementing application functionalities not included in said reduced set, when executed, causes said user interface of said application to be simplified and accelerated than when said source code of said application is executed;

wherein eliminating said at least one of said plurality of identified data element dependencies comprises calls to functions that return a calculated value, said function calls replaced with calls to a new function that returns a set value; and wherein said data dependency graph dataset is calculated based on data elements modified by user input during runtime.

6. The method of claim 5, further comprising removing at least one of said plurality of identified data element dependencies from said at least one source code execution path.

7. The method of claim 6, wherein removing said at least one of said plurality of identified data element dependencies comprises replacing a variable data element with a set value.

8. The method of claim 6, wherein removing said at least one of said plurality of identified data element dependencies comprises deleting a function call wherein user input updates data elements.

9. The method of claim 5, wherein in said revised source code said at least one identified data dependency has been removed.

10. The method of claim 5, wherein said data dependency graph dataset is calculated based on dependencies between inputs and outputs of said source code execution path.

11. The method of claim 5, wherein said data dependency graph dataset is calculated based on dependencies of data elements referenced within said source code execution path on data elements external to said source code execution path.

12. The method of claim 5, wherein said source code when executed is a mobile application and at least one of said data dependencies is dependent on a user input to at least one of a plurality of user interface screens presented on a display of a mobile device that runs said mobile applications.

13. A system for improving a performance of user interface of an application through a controlled removal of functionalities from source code of said application by identifying data dependencies between the source code and selected paths through said source code comprising:
- an interface for communicating with a user;
- one or more non-transitory computer-readable storage mediums;
- code instructions stored on at least one of said one or more storage mediums; one or more processors coupled to said interface and said program store for executing said code instructions, said code instructions comprising:
- a source code of an application, wherein when said source code is executed, said application implements a plurality of application functionalities;
- a data dependency graph dataset mapping a plurality of code segments of said source code into a plurality of source code execution paths and identifying a plurality of data element dependencies from at least one of said plurality of source code execution paths to at least one data element from said source code;
- a list of a subgroup of said plurality of application functionalities desired to be enabled in at least one revised source code, said subgroup is a reduced set of said plurality of application functionalities;
- for each application functionality of said subgroup of said plurality of application functionalities, in said plurality of source code execution paths, at least one source code execution path which covers suitable code segments of said plurality of code segments required for performing respective said each application functionality; at least one of said plurality of data element dependencies required to be eliminated within said at least one identified source code execution path;

said at least one revised source code, wherein said identified at least one data element dependency is eliminated in said at least one new application source code, wherein said at least one new application source code, not implementing application functionalities not included in said reduced set, when executed, causes said user interface of said application to be simplified and accelerated than when said source code of said application is executed;

wherein said at least one of said plurality of identified data element dependencies comprises calls to functions that return a calculated value, said function calls replaced with calls to a new function that returns a set value, and wherein said data dependency graph dataset is calculated based on data elements modified by user input during runtime.

14. The system of claim 13, further comprising code instructions for receiving a file comprising a text list of said selected application functionalities and automatically selecting said identified source code execution path according to said text list, said text list is received according to a user input received via said interface.

15. The system of claim 13, further comprising said interface comprising a graphic user interface (GUI) allowing said user to input said source code by manually inputting a file name and a directory path and/or to said list of sensitive data, and/or to drag and drop a file containing said source code and/or a file containing said list of sensitive data into said GUI.

16. The system of claim 13, further comprising code instructions for editing said identified execution path source code via said interface by said user.

* * * * *